R. H. SALTORS.
SELF TURNING LIGHT FOR ROLLING STOCK.
APPLICATION FILED JULY 28, 1916.
1,217,072.
Patented Feb. 20, 1917.
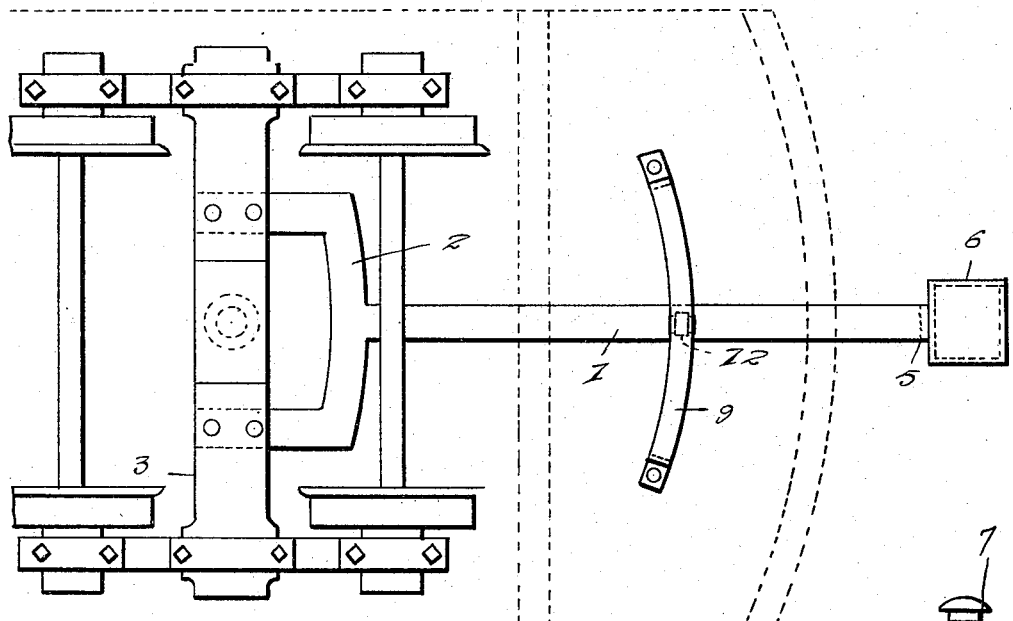
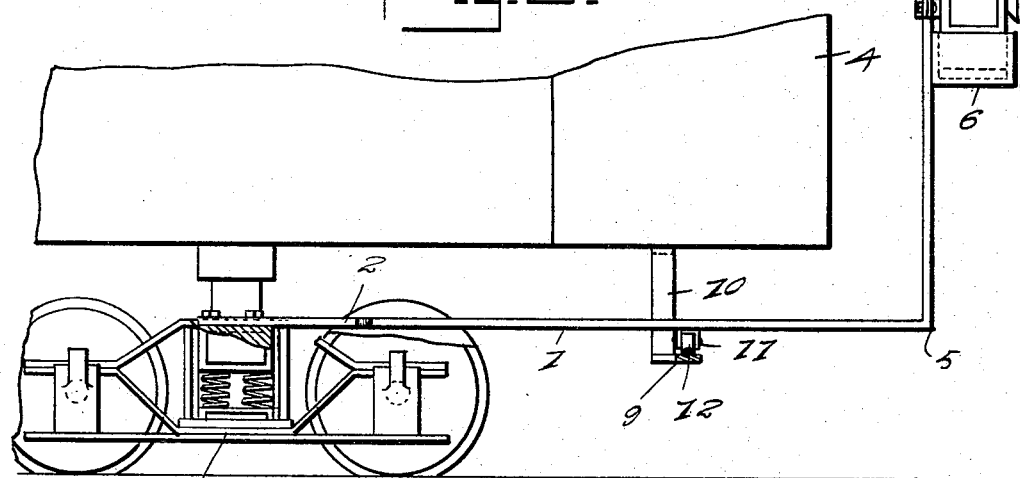
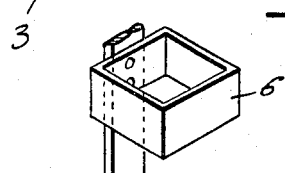

UNITED STATES PATENT OFFICE.

REUBEN H. SALTORS, OF ENSLEY, ALABAMA.

SELF-TURNING LIGHT FOR ROLLING-STOCK.

1,217,072.   Specification of Letters Patent.   Patented Feb. 20, 1917.

Application filed July 28, 1916. Serial No. 111,870.

*To all whom it may concern:*

Be it known that I, REUBEN H. SALTORS, a citizen of the United States, residing at Ensley, in the county of Jefferson and State of Alabama, have invented certain new and useful Improvements in Self-Turning Lights for Rolling-Stock; and I do hereby declare the following to be a full, clear, and exact description of the invention, such as will enable others skilled in the art to which it appertains to make and use the same.

This invention relates to new and useful improvements in a self-turning light for rolling stock and one of its objects is the provision of a device of this character, which shall be simple, durable and efficient, and which may be manufactured and sold at a comparatively low cost.

Another object of this invention is to provide an arm attached to the truck of a car or the like and having its free end bent at right angles and disposed in a vertical plane to support a headlight, so that upon turning of the truck for traveling on a curve in the track, the headlight will swing in the arc of a circle to illuminate the curve, preventing the waste of light upon the side of the track when passing around the curve.

A further object of this invention is to provide an arcuate-shaped track for supporting the forward end of the arm to the car or the like.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a bottom plan view of a self-turning light for a rolling stock, constructed in accordance with my invention, Fig. 2 is a side elevation of the same, illustrating it applied to a railroad car and attached to the truck thereof, and Fig. 3 is a detail perspective view of a support for supporting a head.

Referring in detail to the drawing, the numeral 1 indicates a horizontal arm, having formed on one end a substantially U-shaped member 2, the arm portions of which are bolted or otherwise secured to the forward truck 3 of a car 4, so that the arm 1 underlies the forward end of the car 4 as clearly illustrated in Fig. 2. The arm 1 is bent as illustrated at 5 and disposed in a vertical plane to extend upwardly in front of the car 4. A substantially rectangular support 6 is secured to the vertically extending portion of the arm 1 and receives therein a headlight 7, which may be of any desired construction. Suitable brackets 8 are secured to the rear of the headlight 7 for receiving the upper end of the vertically extending portion of the arm 1 to secure the headlight 7 to the arm.

An arcuate-shaped track 9, having vertically extending arms 10 formed on each end is bolted or otherwise secured to the under face of the forward end of the car 4, so that the arcuate-shaped track 9 underlies the horizontal arm 1. A pair of ears 11 are formed on the horizontal arm 1 and have journaled therebetween a roller 12 which rests upon the arcuate-shaped track 9 to support the forward end of the horizontal arm 1 to the forward end of the car 4.

From the foregoing description taken in connection with the accompanying drawing, it will be noted that upon turning of the truck 3 when traveling upon a curve in a track, the headlight 7 will be swung in the arc of a circle so that the rays from the headlight 7 will be directed around the curve in the track. As the headlight 7 moves in the arc of a circle, the roller 12 travels upon the arcuate-shaped track 9 which efficiently supports the horizontal arm 1 at all times.

While I have shown and described the preferred embodiment of my invention, it will be understood that minor changes in construction, combination and arrangement of parts may be made without departing from the spirit and scope of the invention as claimed.

Having thus described my invention, what I claim is:—

1. In combination, a car having trucks thereon, of a horizontal arm secured to the trucks and having its outer end bent to form a vertical arm, and a headlight carried by the vertical arm and adapted to be swung in the arc of a circle when the trucks are turned by a curve in a track.

2. In combination, a car having trucks thereon, of a horizontal arm, a substantially U-shaped member formed on one end of the horizontal arm and disposed in a horizontal plane therewith and bolted to the truck, said horizontal arm having its other end bent at right angles to form a vertically extending arm, and a headlight carried by the vertical arm adapted to be swung in the arc of a circle when the trucks of the car are turned to illuminate a curve.

3. In combination, a car having trucks thereon, a horizontal arm secured to the truck, said arm being bent at right angles to form a vertically extending arm, a support carried by the vertical arm, a headlight resting within the support, clamps carried by the headlight for securing the headlight to the vertical arm, and means for supporting the forward end of the horizontal arm to the forward end of the car.

4. In combination, a car having trucks thereon, of a horizontal arm secured to the truck, said arm being bent at right angles to form a vertical arm, a headlight secured to the vertical arm, a pair of vertical arms secured to the under face of the forward end of the car and depending upon each side of the horizontal arm, an arcuate-shaped track carried by the pair of relatively spaced arms, and a roller secured to the horizontal arm and resting upon the arcuate-shaped track to support the forward end of the horizontal arm.

In testimony whereof I affix my signature in presence of two witnesses.

R. H. SALTORS.

Witnesses:
　W. A. SPENCER,
　W. J. STACEY.

Copies of this patent may be obtained for five cents each, by addressing the "Commissioner of Patents, Washington, D. C."